United States Patent
Lee et al.

(10) Patent No.: US 9,097,321 B2
(45) Date of Patent: Aug. 4, 2015

(54) PLANETARY GEAR TRAIN OF AUTOMATIC TRANSMISSION FOR VEHICLE

(71) Applicant: Hyundai Motor Company, Seoul (KR)

(72) Inventors: Chang Wook Lee, Suwon-si (KR); Kangsoo Seo, Suwon-si (KR); Jae Chang Kook, Hwaseong-si (KR); Jongsool Park, Hwaseong-si (KR); Myonghoon Noh, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/056,718

(22) Filed: Oct. 17, 2013

(65) Prior Publication Data

US 2014/0148300 A1    May 29, 2014

(30) Foreign Application Priority Data

Nov. 28, 2012 (KR) .......................... 10-2012-0136461

(51) Int. Cl.
*F16H 3/44* (2006.01)
*F16H 3/66* (2006.01)

(52) U.S. Cl.
CPC .................. *F16H 3/666* (2013.01); *F16H 3/66* (2013.01); *F16H 2200/0065* (2013.01); *F16H 2200/2007* (2013.01); *F16H 2200/2046* (2013.01)

(58) Field of Classification Search
None
See application file for complete search history.

(56) References Cited

U.S. PATENT DOCUMENTS 4,615,240 A * 10/1986 Weiss .......................... 475/205

FOREIGN PATENT DOCUMENTS

| JP | 2998941 B2 | 11/1999 |
| JP | 2005-23987 A | 1/2005 |
| KR | 10-1172304 B1 | 8/2012 |

* cited by examiner

*Primary Examiner* — Erin D Bishop
(74) *Attorney, Agent, or Firm* — Morgan, Lewis & Bockius LLP

(57) ABSTRACT

A vehicular planetary gear train may include: a first input shaft; a second parallel shaft; a first planetary gear set including a first element selectively connected to the first shaft, a second element selectively connected to the first shaft and/or a transmission housing, and a third output element; a second planetary gear set including a fourth element connected to the second element, a fifth element connected to the third element and directly connected to an output gear, and a sixth element selectively connected to the first shaft through two paths; four transfer gears connecting the fourth and fifth elements respectively to the second and third elements, and connecting the sixth element to the first shaft through two paths; and frictional elements selectively connecting the first, second, and sixth elements to the first shaft, and a brake selectively connecting the second element to the transmission housing.

13 Claims, 8 Drawing Sheets

FIG. 2

| | C1 | C2 | C3 | C4 | C5 | B1 | GEAR RATIO |
|---|---|---|---|---|---|---|---|
| 1ST | ● | | | | | ● | 4.490 |
| 2ND | ● | | | | ● | | 2.670 |
| 3RD | ● | ● | | | | | 1.860 |
| 4TH | ● | | ● | | | | 1.364 |
| 5TH | | ● | ● | | | | 1.000 |
| 6TH | | | ● | | ● | | 0.794 |
| 7TH | | | ● | ● | | | 0.636 |
| 8TH | | | | ● | ● | | 0.560 |
| 9TH | | ● | | ● | | | 0.502 |
| R | | ● | | | | ● | -4.840 |

PLANETARY GEAR TRAIN OF AUTOMATIC TRANSMISSION FOR VEHICLE

CROSS-REFERENCE TO RELATED APPLICATION

The present application claims priority of Korean Patent Application Number 10-2012-0136461 filed Nov. 28, 2012, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability and power delivery performance and reduce fuel consumption.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a planetary gear train of an automatic transmission for a vehicle having advantages of improving mountability by shortening a length thereof and reducing the number of components as a consequence of achieving nine forward speeds and one reverse speed by disposing two planetary gear sets separately on a first shaft and a second shaft disposed in parallel and connecting rotation elements of the planetary gear sets through a plurality of externally-meshed gears.

In addition, the present invention has been made in an effort to provide a planetary gear train of an automatic transmission for a vehicle having further advantages of enabling of setting optimum gear ratios due to ease of changing gear ratios by using a plurality of externally-meshed gears, and accordingly improving power delivery performance and fuel economy.

A planetary gear train of an automatic transmission for a vehicle according to an aspect of the present invention may include: a first shaft receiving torque of an engine; a second shaft disposed in parallel with the first shaft with a predetermined distance; a first planetary gear set disposed on the first shaft, and including a first rotation element selectively connected to the first shaft, a second rotation element selectively connected to the first shaft and selectively connected to a transmission housing, and a third rotation element operated as an output element; a second planetary gear set disposed on the second shaft, and including a fourth rotation element connected to the second rotation element through an externally-meshed gear, a fifth rotation element connected to the third rotation element through an externally-meshed gear and directly connected to an output gear, and a sixth rotation element selectively connected to the first shaft through two paths including respectively externally-meshed gears; four transfer gears connecting the fourth and fifth rotation elements respectively to the second and third rotation elements, and connecting the sixth rotation element to the first shaft through two paths; and frictional elements including five clutches selectively connecting the first, second, and sixth rotation elements to the first shaft and causing the second planetary gear set to become a direct-coupling state, and a brake selectively connecting the second rotation element to the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The four transfer gears may include: a first transfer gear connecting the first shaft to the sixth rotation element; a second transfer gear connecting the second rotation element to the fourth rotation element; a third transfer gear connecting the first shaft to the sixth rotation element; and a fourth transfer gear connecting the third rotation element to the fifth rotation element.

The first transfer gear may be adapted to reduce a rotational speed of the first shaft, and the third transfer gear may be adapted to increase the rotational speed of the first shaft.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the third transfer gear and the sixth rotation element; a fifth clutch disposed between the fourth rotation element and the sixth rotation element; and a first brake disposed between the second rotation element and the transmission housing.

The first clutch and the first brake may be operated at a first forward speed, the first clutch and the fifth clutch may be operated at a second forward speed, the first clutch and the second clutch may be operated at a third forward speed, the first clutch and the third clutch may be operated at a fourth forward speed, the second clutch and the third clutch may be operated at a fifth forward speed, the third clutch and the fifth clutch may be operated at a sixth forward speed, the third clutch and the fourth clutch may be operated at a seventh forward speed, the fourth clutch and the fifth clutch may be operated at an eighth forward speed, the second clutch and the fourth clutch may be operated at a ninth forward speed, and the second clutch and the first brake may be operated at a reverse speed.

The frictional elements may include: a first clutch disposed between the first transfer gear and the sixth rotation element; a second clutch disposed between the first shaft and the first rotation element; a third clutch disposed between the first shaft and the second rotation element; a fourth clutch disposed between the third transfer gear and the sixth rotation element; a fifth clutch disposed between the fourth rotation element and the sixth rotation element; and a first brake disposed between the second rotation element and the transmission housing.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the first shaft and the third transfer gear; a fifth clutch disposed between the fourth rotation element and the sixth rotation element; and a first brake disposed between the second rotation element and the transmission housing.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the third transfer gear and the sixth rotation element; a fifth clutch disposed between the fourth rotation element and the sixth rotation element; and a first brake disposed between the fourth rotation element and the transmission housing.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The first planetary gear set may be a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

A planetary gear train of an automatic transmission for a vehicle according to another aspect of the present invention may include: a first shaft receiving torque of an engine; a second shaft disposed in parallel with the first shaft with a predetermined distance; a first planetary gear set disposed on the first shaft, and including a first rotation element selectively connected to the first shaft, a second rotation element selectively connected to the first shaft and selectively connected to a transmission housing, and a third rotation element; a second planetary gear set disposed on the second shaft, and including a fourth rotation element connected to the second rotation element, a fifth rotation element connected to the third rotation element and directly connected to an output gear, and a sixth rotation element selectively connected to the first shaft through two paths; a first transfer gear connecting the first shaft to the sixth rotation element; a second transfer gear connecting the second rotation element to the fourth rotation element; a third transfer gear connecting the first shaft to the sixth rotation element; a fourth transfer gear connecting the third rotation element to the fifth rotation element; and frictional elements including five clutches selectively connecting the first, second, and sixth rotation elements to the first shaft and causing the second planetary gear set to become a direct-coupling state, and a brake selectively connecting the second rotation element to the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the third transfer gear and the sixth rotation element; a fifth clutch disposed between the fourth rotation element and the sixth rotation element; and a first brake disposed between the second rotation element and the transmission housing.

The frictional elements may include: a first clutch disposed between the first transfer gear and the sixth rotation element; a second clutch disposed between the first shaft and the first rotation element; a third clutch disposed between the first shaft and the second rotation element; a fourth clutch disposed between the third transfer gear and the sixth rotation element; a fifth clutch disposed between the fourth rotation element and the sixth rotation element; and a first brake disposed between the second rotation element and the transmission housing.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the first shaft and the third transfer gear; a fifth clutch disposed between the fourth rotation element and the sixth rotation element; and a first brake disposed between the second rotation element and the transmission housing.

The frictional elements may include: a first clutch disposed between the first shaft and the first transfer gear; a second clutch disposed between the first shaft and the first rotation element; a third clutch disposed between the first shaft and the second rotation element; a fourth clutch disposed between the third transfer gear and the sixth rotation element; a fifth clutch disposed between the fourth rotation element and the sixth rotation element; and a first brake disposed between the fourth rotation element and the transmission housing.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The first planetary gear set may be a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each shift-speed applied to a planetary gear train according to the first exemplary embodiment of the present invention.

DETAILED DESCRIPTION

Figure 1:
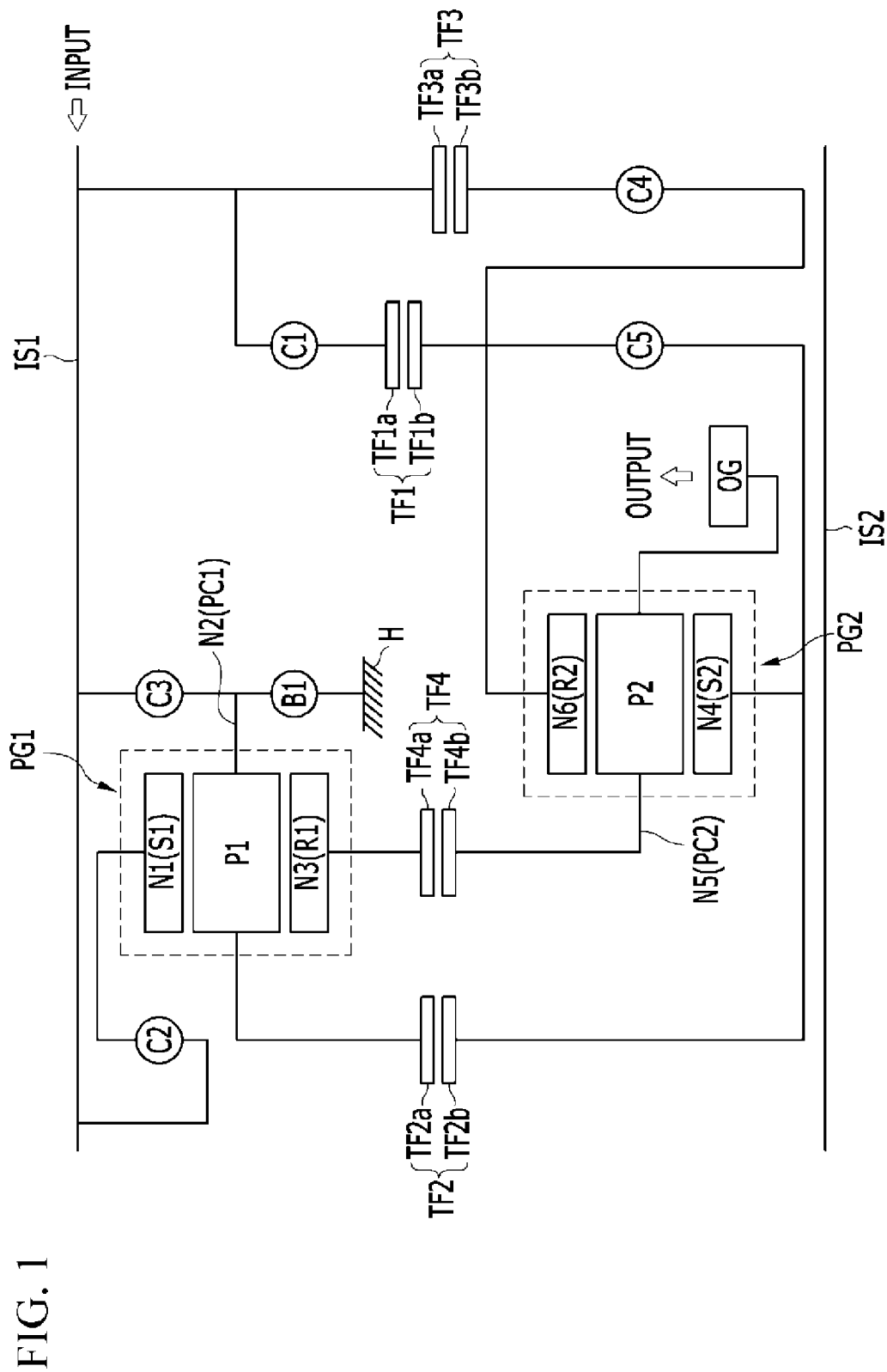
FIG. 1 is a schematic diagram of an exemplary planetary gear train according to a first exemplary embodiment of the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the illustrated exemplary embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to a first exemplary embodiment of the present invention.

Referring to FIG. 1, a planetary gear train according to various embodiments of the present invention includes a first planetary gear set PG1 disposed on a first shaft IS1, a second planetary gear set PG2 disposed on a second shaft IS2 disposed in parallel with the first shaft IS1, four transfer gears TF1, TF2, TF3, and TF4, and frictional elements consisting of five clutches C1, C2, C3, C4, and C5 and one brake B1.

Therefore, torque input from the first shaft IS1 is converted into nine forward speeds and one reverse speed by cooperation of the first and second planetary gear sets PG1 and PG2, and then is output though an output gear OG.

The first shaft IS1 is an input member, and torque from a crankshaft of the engine is changed through a torque converter and is input to the first shaft IS1.

The second shaft IS2 supports the second planetary gear set PG2 without rotational interference therebetween.

The first planetary gear set PG1 is a single pinion planetary gear set, and includes a first sun gear S1 being a first rotation element N1, a first planet carrier PC1 rotatably supporting a first pinion P1 externally meshed with the first sun gear S1 and being a second rotation element N2, and a first ring gear R1 internally meshed with the first pinion P1 and being a third rotation element N3.

The second planetary gear set PG2 is a single pinion planetary gear set, and includes a second sun gear S2 being a fourth rotation element N4, a second planet carrier PC2 rotatably supporting a second pinion P2 externally meshed with the second sun gear S2 and being a fifth rotation element N5, and a second ring gear R2 internally meshed with the second pinion P2 and being a sixth rotation element N6.

The first and second rotation elements N1 and N2 of the first planetary gear set PG1 are selectively connected to the first shaft IS1, the sixth rotation element N6 of the second planetary gear set PG2 is selectively connected to the first shaft IS1 through two paths, the fourth and fifth rotation elements N4 and N5 of the second planetary gear set PG2 are connected respectively to the second and third rotation elements N2 and N3 of the first planetary gear set PG1 through externally-meshed gears, and the fifth rotation element N5 is directly connected to the output gear OG.

The output gear OG drives a drive shaft including a driving wheel through a final reduction gear and a differential apparatus.

The first, second, third, and fourth transfer gears TF1, TF2, TF3, and TF4 respectively have first, second, third, and fourth transfer drive gears TF1a, TF2a, TF3a, and TF4a and first, second, third, and fourth transfer driven gears TF1b, TF2b, TF3b, and TF4b externally meshed with each other.

The first transfer gear TF1 connects the first shaft IS1 with the sixth rotation element N6.

The second transfer gear TF2 connects the second rotation element N2 with the fourth rotation element N4.

The third transfer gear TF3 connects the first shaft IS1 with the sixth rotation element N6.

The fourth transfer gear TF4 connects the third rotation element N3 with the fifth rotation element N5.

Therefore, the rotation elements (including the first shaft IS1) connected with each other through the first, second, third, and fourth transfer gears TF1, TF2, TF3, and TF4 are rotated in opposite directions to each other according to gear ratios of the first, second, third, and fourth transfer gears TF1, TF2, TF3, and TF4.

Although the first and third transfer gears TF1 and TF3 connect the sixth rotation element N6 with the first shaft IS1, a gear ratio of the first transfer gear TF1 differs from that of the third transfer gear TF3.

Therefore, the first transfer gear TF1 may reduce a rotational speed of the first shaft IS1 and may deliver the reduced rotational speed to the sixth rotation element N6. In addition, the third transfer gear TF3 may increase the rotational speed of the first shaft IS1 and may deliver the increased rotational speed to the sixth rotation element N6.

In addition, five clutches C1, C2, C3, C4, and C5 selectively connecting the selected rotation elements (including the first shaft IS1) and one brake B1 selectively connecting the selected rotation element to the transmission housing H are disposed as follows.

The first clutch C1 is disposed between the first shaft IS1 and the first transfer gear TF1.

The second clutch C2 is disposed between the first shaft IS1 and the first rotation element N1.

The third clutch C3 is disposed between the first shaft IS1 and the second rotation element N2.

The fourth clutch C4 is disposed between the third transfer gear TF3 and the sixth rotation element N6.

The fifth clutch C5 is disposed between the fourth rotation element N4 and the sixth rotation element N6.

The first brake B1 is disposed between the second rotation element N2 and the transmission housing H.

The fifth clutch C5 selectively connects two rotation elements of the second planetary gear set PG2 so as to cause the second planetary gear set PG2 to become a direct-coupling state.

In addition, the frictional elements consisting of the first, second, third, fourth, and fifth clutches C1, C2, C3, C4, and C5 and the first brake B1 are conventional multi-plate friction elements of wet type that are operated by hydraulic pressure.

FIG. 2 is an operational chart of friction elements at each shift-speed applied to a planetary gear train according to various embodiments of the present invention.

As shown in FIG. 2, two frictional elements are operated at each shift-speed in the planetary gear train according to various embodiments of the present invention.

The first clutch C1 and the first brake B1 are operated at a first forward speed 1ST.

The first clutch C1 and the fifth clutch C5 are operated at a second forward speed 2ND.

The first clutch C1 and the second clutch C2 are operated at a third forward speed 3RD.

The first clutch C1 and the third clutch C3 are operated at a fourth forward speed 4TH.

The second clutch C2 and the third clutch C3 are operated at a fifth forward speed 5TH.

The third clutch C3 and the fifth clutch C5 are operated at a sixth forward speed 6TH.

The third clutch C3 and the fourth clutch C4 are operated at a seventh forward speed 7TH.

The fourth clutch C4 and the fifth clutch C5 are operated at an eighth forward speed 8TH.

The second clutch C2 and the fourth clutch C4 are operated at a ninth forward speed 9TH.

The second clutch C2 and the first brake B1 are operated at a reverse speed R.

Figure 3:
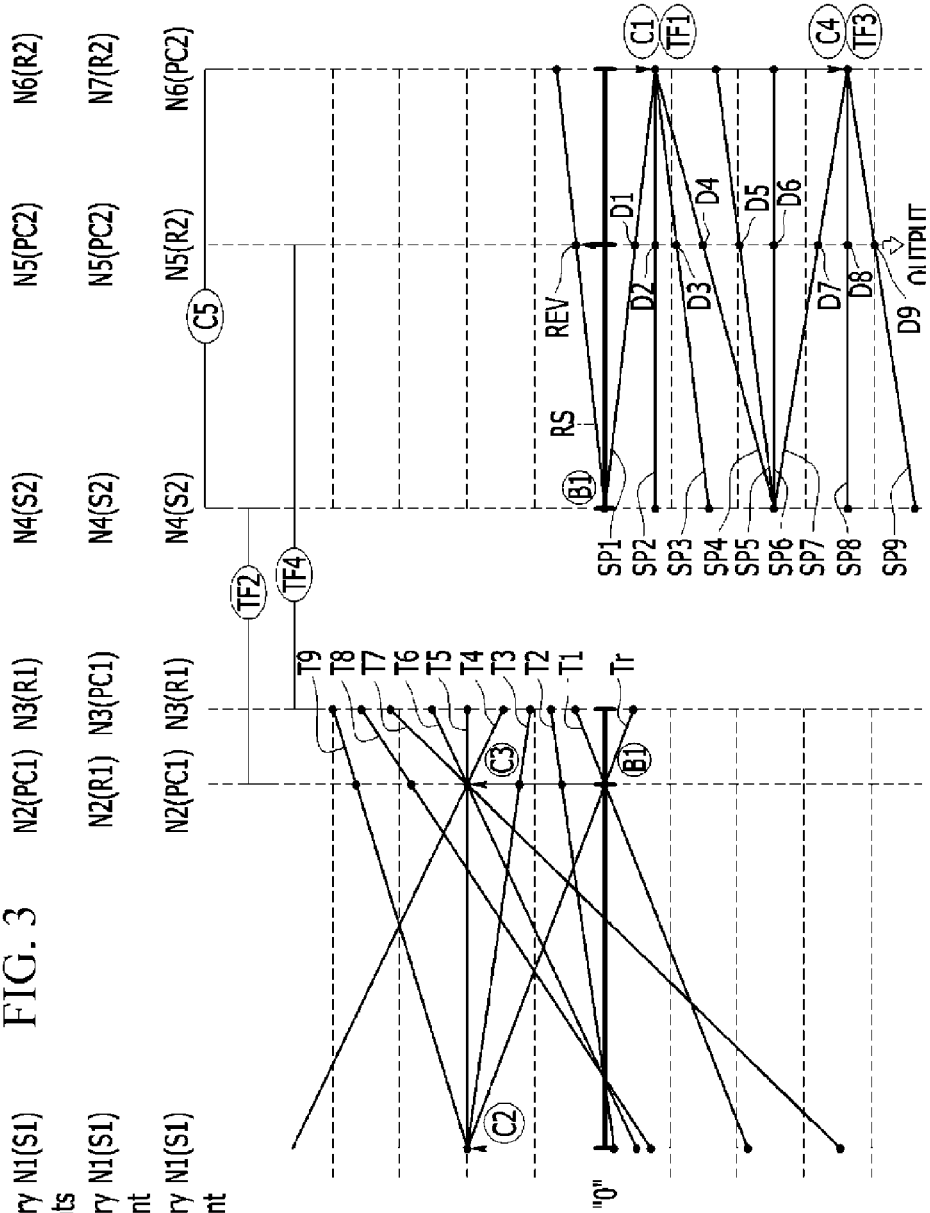
FIG. 3 is a lever diagram of a planetary gear train according to the first exemplary embodiment of the present invention.

FIG. 3 is a lever diagram of a planetary gear train according to various embodiments of the present invention, and illustrates shift processes of the planetary gear train according to various embodiments of the present invention by lever analysis method.

Referring to FIG. 3, three vertical lines of the first planetary gear set PG1 are set as the first, second, and third rotation elements N1, N2, and N3 from the left to the right, and three vertical lines of the second planetary gear set PG2 are set as the fourth, fifth, and sixth rotation elements N4, N5, and N6 from the left to the right.

A middle horizontal line represents a rotational speed of "0", upper horizontal lines represent positive rotational speeds and lower horizontal lines represent negative rotational speeds.

In addition, "−" in FIG. 3 means that rotational elements are rotated in an opposite direction to the rotation direction of the engine. It is because the first shaft IS1 and the first and second planetary gear sets PG1 and PG2 are externally meshed through the first, second, third, and fourth transfer gears TF1, TF2, TF3, and TF4 without an idling gear.

In addition, distances between the vertical lines of the first and second planetary gear sets PG1 and PG2 are set according to gear ratios (teeth number of a sun gear/teeth number of a ring gear).

Hereinafter, referring to FIG. 2 and FIG. 3, the shift processes of the planetary gear train according to various embodiments of the present invention will be described in detail.

First Forward Speed

Referring to FIG. 2, the first clutch C1 and the first brake B1 are operated at the first forward speed 1ST.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, torque of the first shaft IS1 is converted according to the gear ratio of the first transfer gear TF1 by operation of the first clutch C1 and is then input to the sixth rotation element N6. In addition, the second rotation element N2 is operated as a fixed element by operation of the first brake B1.

Therefore, the rotation elements of the first planetary gear set PG1 form a first speed line T1, the rotation elements of the second planetary gear set PG2 form a first shift line SP1, and D1 is output through the fifth rotation element N5 that is an output element.

Second Forward Speed

The first brake B1 that was operated at the first forward speed 1ST is released and the fifth clutch C5 is operated at the second forward speed 2ND.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is converted according to the gear ratio of the first transfer gear TF1 by operation of the first clutch C1 and is then input to the sixth rotation element N6. In addition, the second planetary gear set PG2 becomes the direct-coupling state by operation of the fifth clutch C5.

Therefore, the rotation elements of the first planetary gear set PG1 form a second speed line T2, the rotation elements of the second planetary gear set PG2 form a second shift line SP2, and D2 is output through the fifth rotation element N5 that is the output element.

Third Forward Speed

The fifth clutch C5 that was operated at the second forward speed 2ND is released and the second clutch C2 is operated at the third forward speed 3RD.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is converted according to the gear ratio of the first transfer gear TF1 by operation of the first clutch C1 and is then input to the sixth rotation element N6. In addition, the torque of the first shaft IS1 is directly input to the first rotation element N1 by operation of the second clutch C2.

Therefore, the rotation elements of the first planetary gear set PG1 form a third speed line T3, the rotation elements of the second planetary gear set PG2 form a third shift line SP3, and D3 is output through the fifth rotation element N5 that is the output element.

Fourth Forward Speed

The second clutch C2 that was operated at the third forward speed 3RD is released and the third clutch C3 is operated at the fourth forward speed 4TH.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is converted according to the gear ratio of the first transfer gear TF1 by operation of the first clutch C1 and is then input to the sixth rotation element N6. In addition, the torque of the first shaft IS1 is directly input to the second rotation element N2 by operation of the third clutch C3.

Therefore, the rotation elements of the first planetary gear set PG1 form a fourth speed line T4, the rotation elements of the second planetary gear set PG2 form a fourth shift line SP4, and D4 is output through the fifth rotation element N5 that is the output element.

Fifth Forward Speed

The first clutch C1 that was operated at the fourth forward speed 4TH is released and the second clutch C2 is output through the fifth forward speed 5TH.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is directly input to the second rotation element N2 by operation of the third clutch C3 and is directly input to the first rotation element N1 by operation of the second clutch C2.

Therefore, the rotation elements of the first planetary gear set PG1 form a fifth speed line T5, the rotation elements of the second planetary gear set PG2 form a fifth shift line SP5, and D5 is output through the fifth rotation element N5 that is the output element.

Sixth Forward Speed

The second clutch C2 that was operated at the fifth forward speed 5TH is released and the fifth clutch C5 is operated at the sixth forward speed 6TH.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is directly input to the second rotation element N2 by operation of the third clutch C3 and the second planetary gear set PG2 becomes the direct-coupling state by operation of the fifth clutch C5.

Therefore, the rotation elements of the first planetary gear set PG1 form a sixth speed line T6, the rotation elements of the second planetary gear set PG2 form a sixth shift line SP6, and D6 is output through the fifth rotation element N5 that is the output element.

Seventh Forward Speed

The fifth clutch C5 that was operated at the sixth forward speed 6TH is released and the fourth clutch C4 is operated at the seventh forward speed 7TH.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is directly input to the second rotation element N2 by operation of the third clutch C3. In addition, the torque of the first shaft IS1 is converted according to the gear ratio of the third transfer gear TF3 by operation of the fourth clutch C4 and is then input to the sixth rotation element N6.

Therefore, the rotation elements of the first planetary gear set PG1 form a seventh speed line T7, the rotation elements of the second planetary gear set PG2 form a seventh shift line SP7, and D7 is output through the fifth rotation element N5 that is the output element.

Eighth Forward Speed

The third clutch C3 that was operated at the seventh forward speed 7TH is released and the fifth clutch C5 is operated at the eighth forward speed 8TH.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is converted according to the gear ratio of the third transfer gear TF4 by operation of the fourth clutch C4 and is then input to the sixth rotation element N6. In addition, the second planetary gear set PG2 becomes the direct-coupling state by operation of the fifth clutch C5.

Therefore, the rotation elements of the first planetary gear set PG1 form an eighth speed line T8, the rotation elements of the second planetary gear set PG2 form an eighth shift line SP8, and D8 is output through the fifth rotation element N5 that is the output element.

Ninth Forward Speed

The fifth clutch C5 that was operated at the eighth forward speed 8TH is released and the second clutch C2 is operated at the ninth forward speed 9TH.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is converted according to the gear ratio of the third transfer gear TF4 by operation of the fourth clutch C4 and is then input to the sixth rotation element N6. In addition, the torque of the first shaft IS1 is directly input to the first rotation element N1 by operation of the second clutch C2.

Therefore, the rotation elements of the first planetary gear set PG1 form a ninth speed line T9, the rotation elements of the second planetary gear set PG2 form a ninth shift line SP9, and D9 is output through the fifth rotation element N5 that is the output element.

Reverse Speed

As shown in FIG. 2, the second clutch C2 and the first brake B1 are operated at the reverse speed R.

As shown in FIG. 3, the second rotation element N2 is directly connected to the fourth rotation element N4 through the second transfer gear TF2, and the third rotation element N3 is directly connected to the fifth rotation element N5 through the fourth transfer gear TF4.

At this state, the torque of the first shaft IS1 is directly input to the first rotation element N1 by operation of the second clutch C2, and the second rotation element N2 is operated as a fixed element by operation of the first brake B 1.

Therefore, the rotation elements of the first planetary gear set PG1 form a reverse speed line Tr, the rotation elements of the second planetary gear set PG2 form a reverse shift line RS, and REV is output through the fifth rotation element N5 that is the output element.

As described above, the planetary gear train according to the first exemplary embodiment of the present invention can achieve nine forward speeds and one reverse speed by combining two planetary gear sets PG1 and PG2 being the simple planetary gear sets, four transfer gears TF1, TF2, TF3, and TF4 and six frictional elements C1, C2, C3, C4, C5, and B1.

In addition, optimum gear ratios may be set due to ease of changing gear ratios by using four transfer gears being externally-meshed gears as well as the planetary gear sets. Since gear ratios can be changed according to target performance, starting performance, power delivery performance and fuel economy may be improved. Therefore, a start-up clutch instead of a torque converter may be used.

In addition, two friction elements are operated at each shift-speed and one friction element is released and another friction element is operated so as to shift to a neighboring shift-speed. Therefore, shift control condition is fully satisfied.

Figure 4:
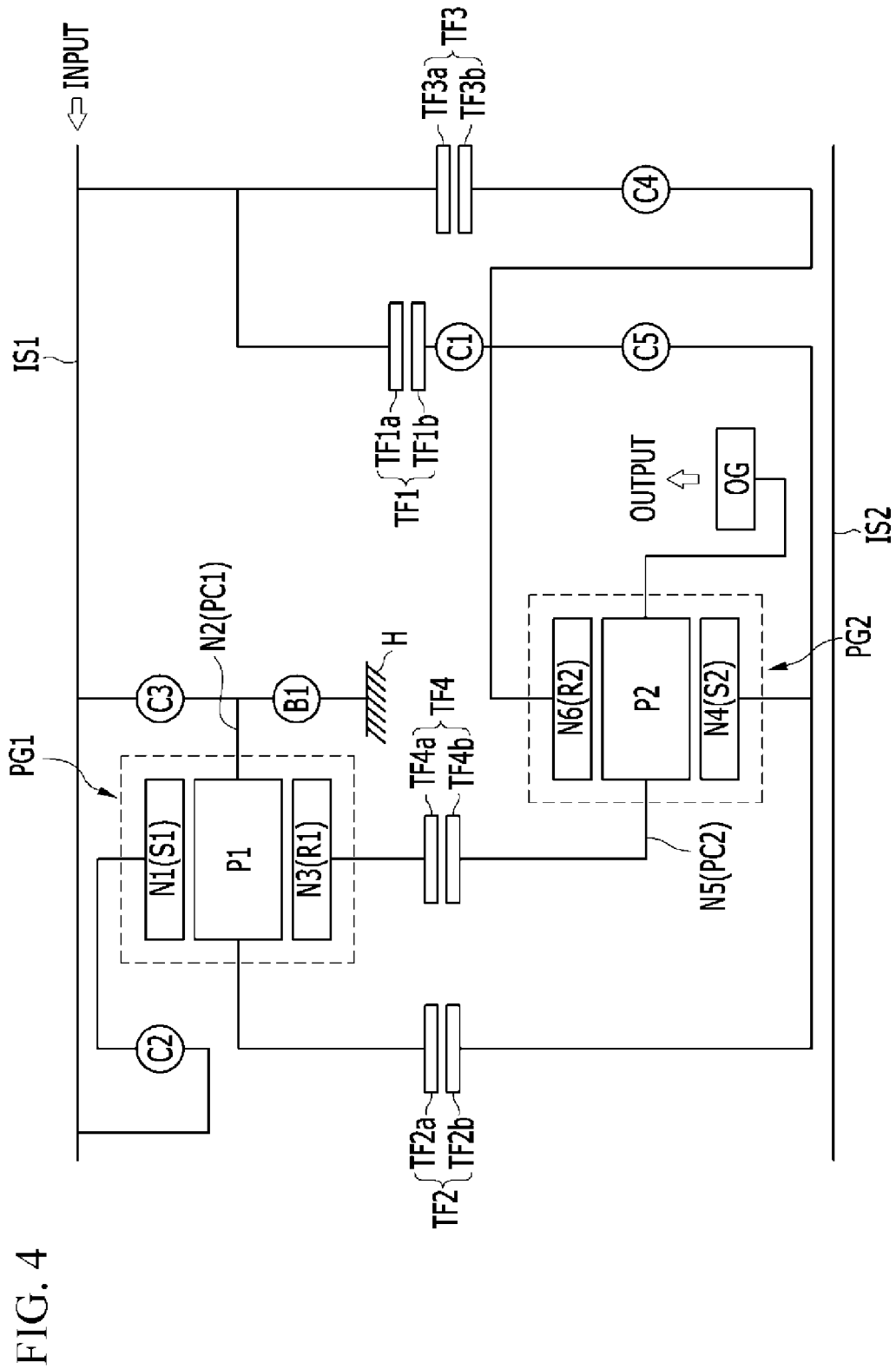
FIG. 4 is a schematic diagram of a planetary gear train according to a second exemplary embodiment of the present invention.

FIG. 4 is a schematic diagram of a planetary gear train according to a second exemplary embodiment of the present invention.

Referring to FIG. 4, the first clutch C1 is disposed between the first rotation element N1 and the first transfer gear TF1 in the first exemplary embodiment, but the first clutch C1 is disposed between the first transfer gear TF1 and the sixth rotation element N6 in the second exemplary embodiment.

Since functions of the second exemplary embodiment are the same as those of the first exemplary embodiment except the position of the first clutch C1, detailed description thereof will be omitted.

Figure 5:
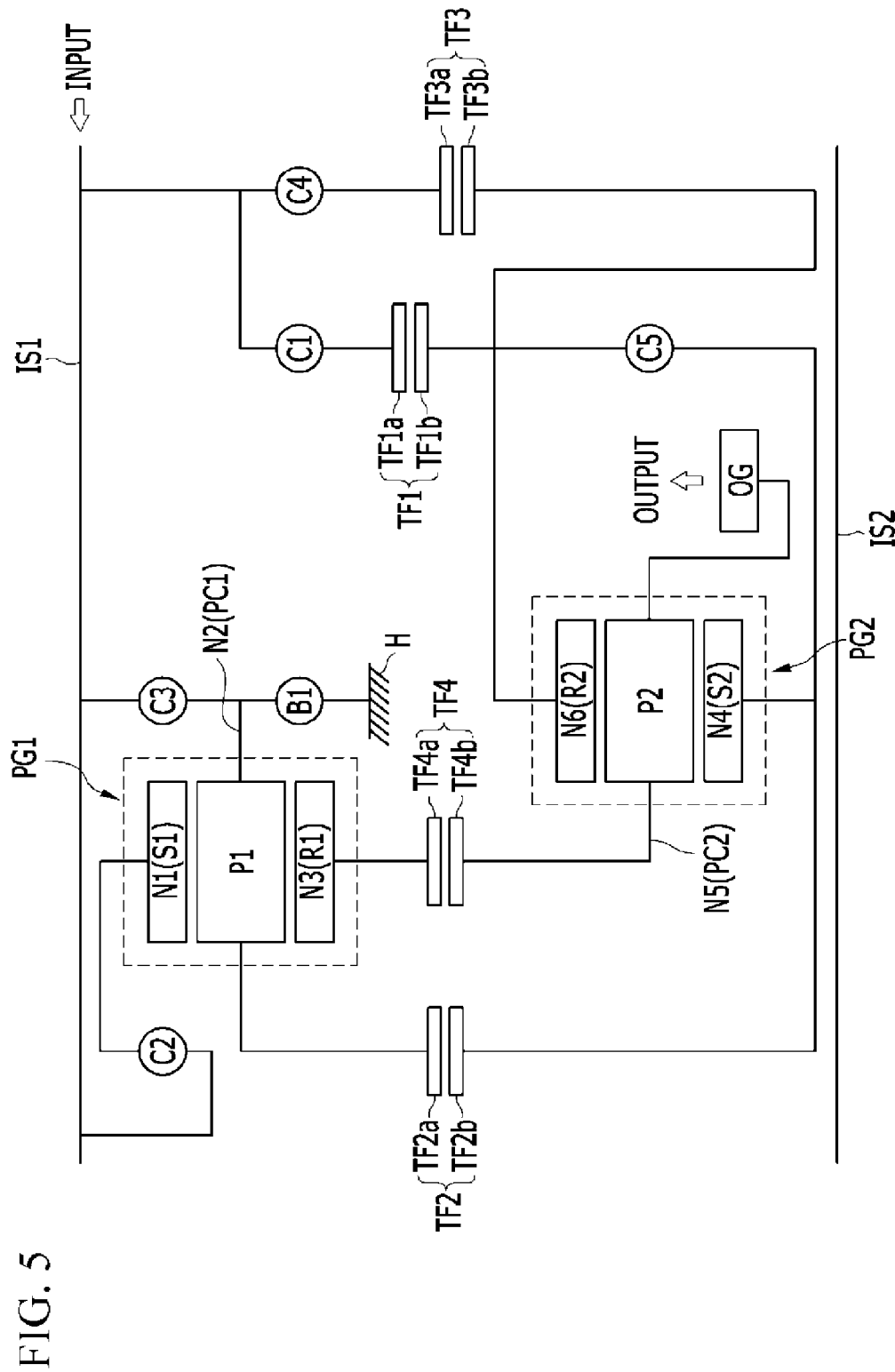
FIG. 5 is a schematic diagram of a planetary gear train according to a third exemplary embodiment of the present invention.

FIG. 5 is a schematic diagram of a planetary gear train according to a third exemplary embodiment of the present invention.

Referring to FIG. 5, the fourth clutch C4 is disposed between the third transfer gear TF3 and the sixth rotation element N6 in the first exemplary embodiment, but the fourth clutch C4 is disposed between the first shaft IS1 and the third transfer gear TF3 in the third exemplary embodiment.

Since functions of the third exemplary embodiment are the same as those of the first exemplary embodiment except the position of the fourth clutch C4, a detailed description thereof will be omitted.

Figure 6:
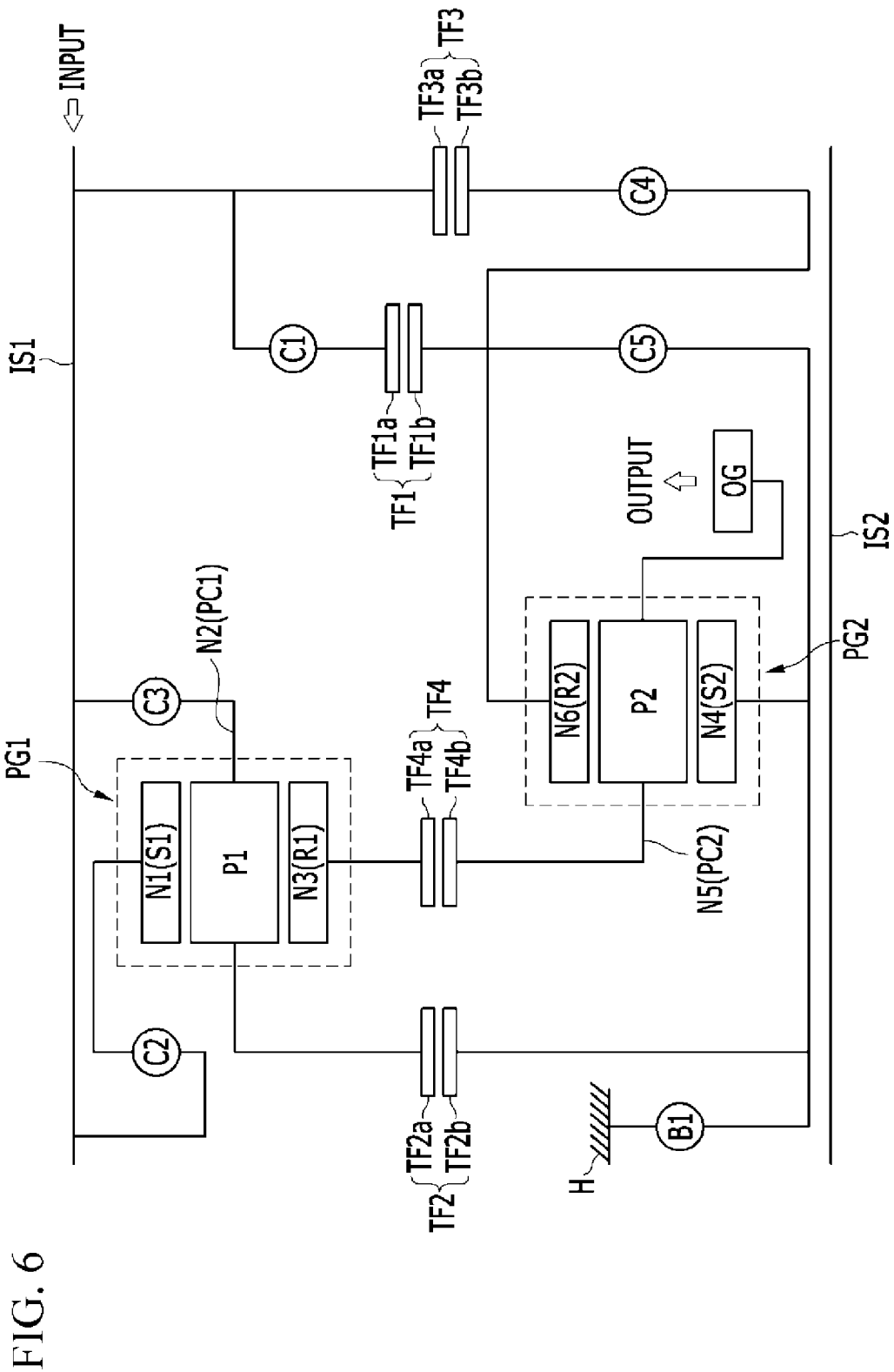
FIG. 6 is a schematic diagram of a planetary gear train according to a fourth exemplary embodiment of the present invention.

FIG. 6 is a schematic diagram of a planetary gear train according to a fourth exemplary embodiment of the present invention.

Referring to FIG. 6, the first brake B1 is disposed between the second rotation element N2 and the transmission housing H in the first exemplary embodiment, but the first brake B1 is disposed between the fourth rotation element N4 and the transmission housing H in the fourth exemplary embodiment.

Since functions of the fourth exemplary embodiment are the same as those of the first exemplary embodiment except the position of the first brake B1, a detailed description thereof will be omitted.

Figure 7:
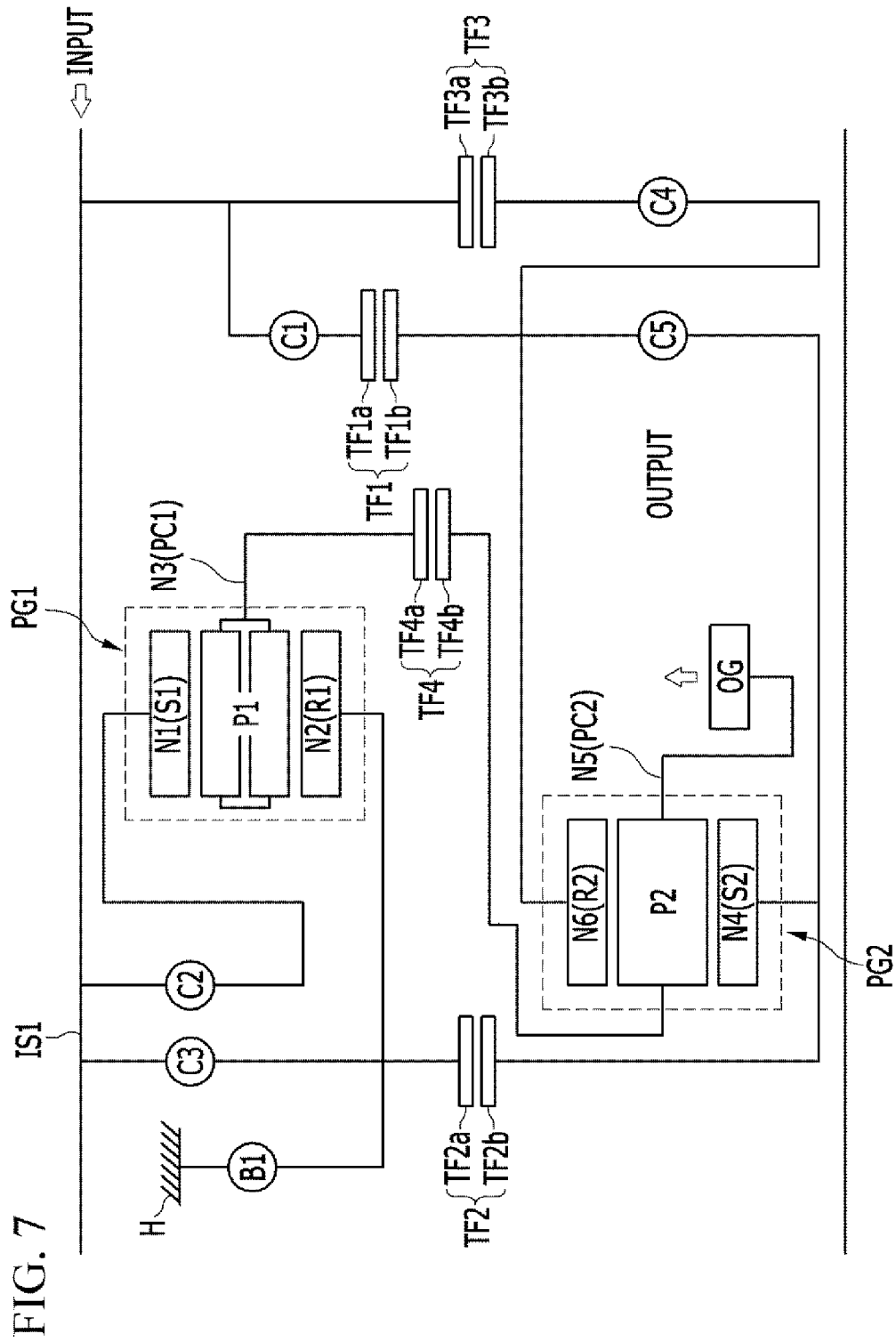
FIG. 7 is a schematic diagram of a planetary gear train according to a fifth exemplary embodiment of the present invention.

FIG. 7 is a schematic diagram of a planetary gear train according to a fifth exemplary embodiment of the present invention.

Referring to FIG. 7, the first planetary gear set PG1 is the single pinion planetary gear set in the first exemplary embodiment, but the first planetary gear set PG1 is a double pinion planetary gear set in the fifth exemplary embodiment.

Therefore, the second rotation element N2 is changed from the first planet carrier PC1 to the first ring gear R1 and the third rotation element N3 is changed from the first ring gear R1 to the first planet carrier PC1.

Since functions of the fifth exemplary embodiment are the same as those of the first exemplary embodiment except the rotation elements consisting of the second and third rotation elements N2 and N3, a detailed description thereof will be omitted.

Figure 8:
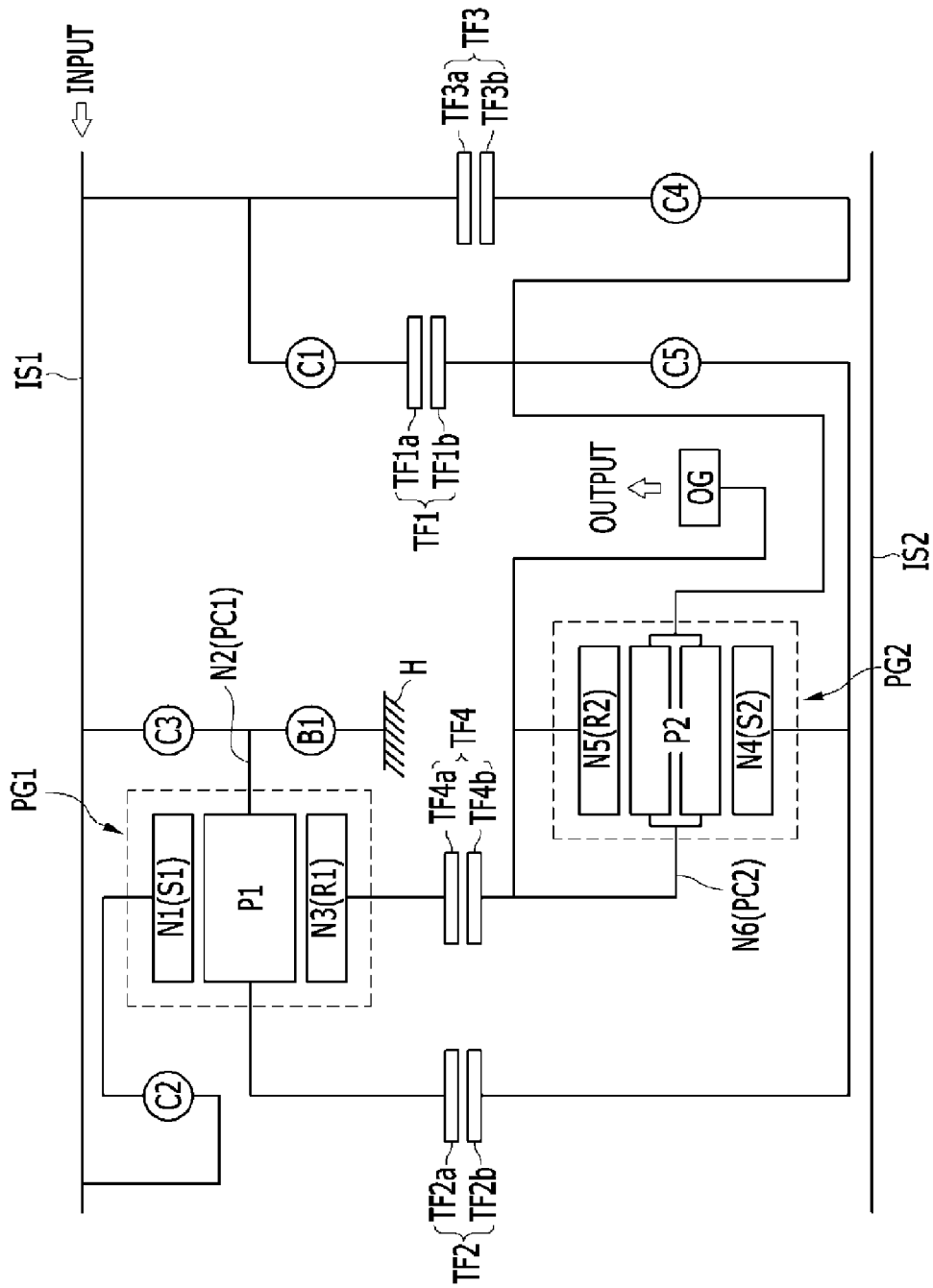
FIG. 8 is a schematic diagram of a planetary gear train according to a sixth exemplary embodiment of the present invention.

FIG. 8 is a schematic diagram of a planetary gear train according to a sixth exemplary embodiment of the present invention.

Referring to FIG. 8, the second planetary gear set PG2 is the single pinion planetary gear set in the first exemplary embodiment, but the second planetary gear set PG2 is a double pinion planetary gear set in the sixth exemplary embodiment.

Therefore, the fifth rotation element N5 is changed from the second planet carrier PC2 to the second ring gear R2, and the sixth rotation element N6 is changed from the second ring gear R2 to the second planet carrier PC2.

Since functions of the sixth exemplary embodiment are the same as those of the first exemplary embodiment except the rotation elements consisting of the fifth and sixth rotation elements N5 and N6, a detailed description will be omitted.

Meanwhile, it is illustrated, but is not limited, in the drawings that the second shaft IS2 merely supports the second planetary gear set PG2 without rotational interference therebetween. The fourth rotation element N4 may be used as a connecting member connecting with the second transfer gear TF2 or the fifth clutch C5.

Nine forward speeds and one reverse speed can be achieved by combining two planetary gear sets being the simple planetary gear sets, four transfer gears and six frictional elements according to various embodiments of the present invention.

In addition, since two planetary gear sets are disposed separately on the first shaft and the second shaft disposed in parallel with a predetermined distance, a length thereof may be reduced and mountability may be improved.

In addition, optimum gear ratios may be set due to ease of changing gear ratios by using four external-meshing gears as well as the planetary gear sets. Since gear ratios can be changed according to target performance, starting performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   a first shaft receiving torque of an engine;
   a second shaft parallel with the first shaft;
   a first planetary gear set disposed around the first shaft and including a first rotation element selectively connected to the first shaft, a second rotation element selectively connected to the first shaft and selectively connected to a transmission housing, and a third rotation element operated as an output element; and
   a second planetary gear set disposed around and supported by the second shaft and including a fourth rotation element connected to the second rotation element through a first externally-meshed gear, a fifth rotation element connected to the third rotation element through a second externally-meshed gear and directly connected to an output gear, and a sixth rotation element selectively connected to the first shaft through two paths, one of the two paths including a third externally-meshed gear, and another of the two paths including a fourth externally-meshed gear,
   wherein the first planetary gear set is a single pinion planetary gear set including a first sun gear being the first rotation element, a first planet carrier being the second rotation element, and a first ring gear being the third rotation element, and
   the second planetary gear set is a single pinion planetary gear set including a second sun gear being the fourth rotation element, a second planet carrier being the fifth rotation element, and a second ring gear being the sixth rotation element.

2. The planetary gear train of claim 1, further including:
   the third externally-meshed gear connecting the first shaft to the sixth rotation element;
   the first externally-meshed gear connecting the second rotation element to the fourth rotation element;
   the fourth externally-meshed gear connecting the first shaft to the sixth rotation element; and
   the second externally-meshed gear connecting the third rotation element to the fifth rotation element.

3. The planetary gear train of claim 2, wherein the third externally-meshed gear is adapted to reduce a rotational speed of the first shaft, and the fourth externally-meshed gear is adapted to increase the rotational speed of the first shaft.

4. The planetary gear train of claim 2, further including:
   a first clutch disposed between the first shaft and the third externally-meshed gear;
   a second clutch disposed between the first shaft and the first rotation element;
   a third clutch disposed between the first shaft and the second rotation element;
   a fourth clutch disposed between the fourth externally-meshed gear and the sixth rotation element;
   a fifth clutch disposed between the fourth rotation element and the sixth rotation element; and
   a first brake disposed between the second rotation element and the transmission housing.

5. The planetary gear train of claim 4, wherein the first clutch and the first brake are operated at a first forward speed;
   the first clutch and the fifth clutch are operated at a second forward speed;
   the first clutch and the second clutch are operated at a third forward speed;
   the first clutch and the third clutch are operated at a fourth forward speed;
   the second clutch and the third clutch are operated at a fifth forward speed;
   the third clutch and the fifth clutch are operated at a sixth forward speed;
   the third clutch and the fourth clutch are operated at a seventh forward speed;
   the fourth clutch and the fifth clutch are operated at an eighth forward speed;
   the second clutch and the fourth clutch are operated at a ninth forward speed; and
   the second clutch and the first brake are operated at a reverse speed.

6. The planetary gear train of claim 2, further including:
   a first clutch disposed between the third externally-meshed gear and the sixth rotation element;
   a second clutch disposed between the first shaft and the first rotation element;
   a third clutch disposed between the first shaft and the second rotation element;
   a fourth clutch disposed between the fourth externally-meshed gear and the sixth rotation element;
   a fifth clutch disposed between the fourth rotation element and the sixth rotation element; and
   a first brake disposed between the second rotation element and the transmission housing.

7. The planetary gear train of claim 2, further including:
   a first clutch disposed between the first shaft and the third externally-meshed gear;
   a second clutch disposed between the first shaft and the first rotation element;
   a third clutch disposed between the first shaft and the second rotation element;
   a fourth clutch disposed between the first shaft and the fourth externally-meshed gear;
   a fifth clutch disposed between the fourth rotation element and the sixth rotation element; and
   a first brake disposed between the second rotation element and the transmission housing.

8. The planetary gear train of claim 2, further including:
   a first clutch disposed between the first shaft and the third externally-meshed gear;
   a second clutch disposed between the first shaft and the first rotation element;
   a third clutch disposed between the first shaft and the second rotation element;
   a fourth clutch disposed between the fourth externally-meshed gear and the sixth rotation element;
   a fifth clutch disposed between the fourth rotation element and the sixth rotation element; and
   a first brake disposed between the fourth rotation element and the transmission housing.

9. A planetary gear train of an automatic transmission for a vehicle, comprising:
   a first shaft receiving torque of an engine;
   a second shaft parallel with the first shaft;
   a first planetary gear set disposed around the first shaft, and including a first rotation element selectively connected to the first shaft, a second rotation element selectively connected to the first shaft and selectively connected to a transmission housing, and a third rotation element;

a second planetary gear set disposed around and supported by the second shaft, and including a fourth rotation element connected to the second rotation element, a fifth rotation element connected to the third rotation element and directly connected to an output gear, and a sixth rotation element selectively connected to the first shaft through two paths;

a first transfer gear connecting the first shaft to the sixth rotation element through a first path of the two paths;

a second transfer gear connecting the second rotation element to the fourth rotation element;

a third transfer gear connecting the first shaft to the sixth rotation element through a second path of the two paths; and a fourth transfer gear connecting the third rotation element to the fifth rotation element, wherein the first planetary gear set is a single pinion planetary gear set including a first sun gear being the first rotation element, a first planet carrier being the second rotation element, and a first ring gear being the third rotation element, and the second planetary gear set is a single pinion planetary gear set including a second sun gear being the fourth rotation element, a second planet carrier being the fifth rotation element, and a second ring gear being the sixth rotation element.

10. The planetary gear train of claim 9, further including:

a first clutch disposed between the first shaft and the first transfer gear;

a second clutch disposed between the first shaft and the first rotation element;

a third clutch disposed between the first shaft and the second rotation element;

a fourth clutch disposed between the third transfer gear and the sixth rotation element;

a fifth clutch disposed between the fourth rotation element and the sixth rotation element; and a first brake disposed between the second rotation element and the transmission housing.

11. The planetary gear train of claim 9, further including:

a first clutch disposed between the first transfer gear and the sixth rotation element;

a second clutch disposed between the first shaft and the first rotation element;

a third clutch disposed between the first shaft and the second rotation element;

a fourth clutch disposed between the third transfer gear and the sixth rotation element;

a fifth clutch disposed between the fourth rotation element and the sixth rotation element; and a first brake disposed between the second rotation element and the transmission housing.

12. The planetary gear train of claim 9, further including:

a first clutch disposed between the first shaft and the first transfer gear;

a second clutch disposed between the first shaft and the first rotation element;

a third clutch disposed between the first shaft and the second rotation element;

a fourth clutch disposed between the first shaft and the third transfer gear;

a fifth clutch disposed between the fourth rotation element and the sixth rotation element; and a first brake disposed between the second rotation element and the transmission housing.

13. The planetary gear train of claim 9, further including:

a first clutch disposed between the first shaft and the first transfer gear;

a second clutch disposed between the first shaft and the first rotation element;

a third clutch disposed between the first shaft and the second rotation element;

a fourth clutch disposed between the third transfer gear and the sixth rotation element;

a fifth clutch disposed between the fourth rotation element and the sixth rotation element; and a first brake disposed between the fourth rotation element and the transmission housing.

* * * * *